9655X
L. R. Prince,
Washing Machine,
Patented May 14, 1836
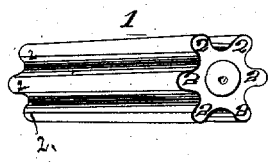
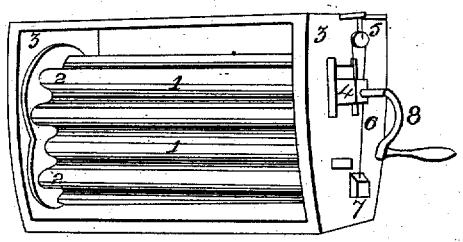
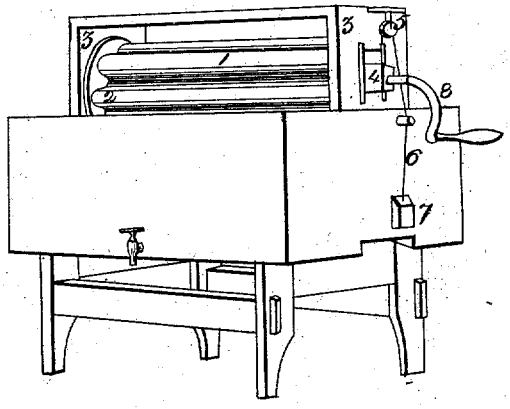
N. PETERS, PHOTO-LITHOGRAPHER, WASHINGTON, D. C.

May 14. 1836 505

9655X

Luke R. Prince of Beverly, Massachusetts.

Letters Patent.

The schedule referred to in these Letters Patent and making part of the same, containing a description in the words of the said Luke R. Prince himself of his improvement in the cog cylinder Washing machine, —

To all persons to whom these presents shall come, Luke R. Prince of Beverly in the County of Essex and State of Massachusetts housewright sends greeting —

Be it known that I the said Luke R. Prince have invented, constructed, made, and applied to use, a new and useful improvement in the mode of Washing and Cleansing Clothes and cloths by machinery called "The cog cylinder Washing Machine" specified in the words following viz This improvement in the mode of washing and cleansing clothes and cloths is effected by a machine constructed as follows, viz two cogged cylinders both of the same length, the cogs rounded at the outer ends, placed horizontally one above the other, the lower cylinder made to revolve on an axis, the ends of which are inserted into standards, at each end of the cylinder, and the upper cylinder revolves on another axis, the ends of which are fixed in boxes, or hubs inserted into said standards, one at each end of said cylinder, which boxes or hubs together with the upper cylinder, and its axis rise or fall by turning a crank, affixed to one end of the axis of the upper cylinder. The said cylinders are placed so near each other, that the cogs of one are inserted between the cogs of the other, and by turning the crank at the end of the upper cylinder, that cylinder is put in motion, which communicates motion to the lower cylinder at the same time; The clothes to be washed are drawn through and between the two two cylinders by turning the crank affixed to the upper one, the upper cylinder with its axis, boxes and crank, rising and falling at every revolution of the crank whereby the clothes between the cylinders are rubbed and washed and cleansed, weights are appended to each end of the axis of the upper cylinder by a string passing through pullies fastened above the ends of the axis which weights serve to raise the upper cylinder and regulate its motion while the crank is turned.

In testimony that the above is a true specification of my said improvement as above described I have hereto set my hand the third day of February A.D. 1836

Luke R. Prince

Witnesses
Humphrey Cook
Jno [illegible] King

Drawing 500 wds

Exd.
W.H.